United States Patent
Yi et al.

(10) Patent No.: US 9,503,916 B2
(45) Date of Patent: *Nov. 22, 2016

(54) METHOD FOR TRANSMITTING STATUS REPORT OF PDCP LAYER IN MOBILE TELECOMMUNICATIONS SYSTEM AND RECEIVER OF MOBILE TELECOMMUNICATIONS

(71) Applicant: Optis Cellular Technology, LLC, Plano, TX (US)

(72) Inventors: Seung-June Yi, Anyang-si (KR); Sung-Jun Park, Anyang-si (KR); Young-Dae Lee, Anyang-si (KR); Sung-Duck Chun, Anyang-si (KR)

(73) Assignee: Optis Cellular Technology, LLC, Plano, TX (US)

( * ) Notice: Subject to any disclaimer, the term of this patent is extended or adjusted under 35 U.S.C. 154(b) by 454 days.

This patent is subject to a terminal disclaimer.

(21) Appl. No.: 13/970,508

(22) Filed: Aug. 19, 2013

(65) Prior Publication Data

US 2014/0003346 A1 Jan. 2, 2014

Related U.S. Application Data

(63) Continuation of application No. 13/051,803, filed on Mar. 18, 2011, now Pat. No. 8,514,814, which is a continuation of application No. 12/523,090, filed as application No. PCT/KR2008/005345 on Sep. 10, 2008, now Pat. No. 7,936,723.

(60) Provisional application No. 60/971,480, filed on Sep. 11, 2007.

(30) Foreign Application Priority Data

Sep. 9, 2008 (KR) ........................ 10-2008-0088970

(51) Int. Cl.
*H04W 4/00* (2009.01)
*H04W 24/02* (2009.01)

(Continued)

(52) U.S. Cl.
CPC ............ *H04W 24/02* (2013.01); *H04L 1/1614* (2013.01); *H04L 1/1685* (2013.01); *H04W 80/02* (2013.01); *H04W 28/06* (2013.01)

(58) Field of Classification Search
CPC ... H04W 24/02; H04W 28/06; H04W 80/02; H04L 1/1614; H04L 1/1685
See application file for complete search history.

(56) References Cited

U.S. PATENT DOCUMENTS 7,957,430 B2 *  6/2011  Kashima ............... H04L 1/1621
                                              370/229
7,978,616 B2 *  7/2011  Chun ................... H04W 28/06
                                              370/242

(Continued)

FOREIGN PATENT DOCUMENTS

CN          1695354        11/2005
EP          1626518        2/2006

(Continued)

OTHER PUBLICATIONS

Chinese Office Action and Search Report dated Sep. 3, 2014 in CN 201210301159.8 and English translation, 14 pages.

(Continued)

*Primary Examiner* — Kevin Mew
(74) *Attorney, Agent, or Firm* — Nixon & Vanderhye P.C.

(57) ABSTRACT

Disclosed is a status report transmission of the PDCP layer for a PDCP status report which can reduce radio resources, by transmitting the reception success or failure of a series of PDCP SDUs in the form of a bitmap when configuring the PDCP status report for reporting a reception status of the PDCP SDU to another party in the PDCP layer in the LTE system.

14 Claims, 8 Drawing Sheets

(51) Int. Cl.
*H04L 1/16* (2006.01)
*H04W 80/02* (2009.01)
*H04W 28/06* (2009.01)

(56) References Cited

U.S. PATENT DOCUMENTS

| | | | | |
|---|---|---|---|---|
| 8,335,189 | B2* | 12/2012 | Wang | H04W 12/02 370/331 |
| 2003/0123485 | A1* | 7/2003 | Yi | H04W 28/06 370/477 |
| 2008/0026744 | A1* | 1/2008 | Frederiksen | H04L 1/0026 455/425 |
| 2008/0130580 | A1* | 6/2008 | Chaponniere | H04W 36/02 370/331 |
| 2008/0273537 | A1* | 11/2008 | Meylan | H04L 63/0457 370/394 |
| 2008/0294958 | A1* | 11/2008 | Lee | H04L 1/1614 714/748 |
| 2009/0104890 | A1* | 4/2009 | Wang | H04W 12/02 455/410 |
| 2009/0196252 | A1* | 8/2009 | Fischer | H04L 1/0031 370/331 |
| 2009/0238142 | A1* | 9/2009 | Chun | H04W 28/06 370/331 |

FOREIGN PATENT DOCUMENTS

| | | |
|---|---|---|
| WO | 01/78286 | 10/2001 |
| WO | 2006/118418 | 11/2006 |
| WO | 2007/078142 | 7/2007 |

OTHER PUBLICATIONS

"3rd Generation Partnership Project; Technical Specification Group Radio Access Network; Evolved Universal Terrestrial Radio Access (E-UTRA); Packet Data Convergence Protocol (PDCP) specification (Release 8)", 3GPP Standard; 3GPP TS 36.323, 3rd Generation Partnership Project (3GPP), Mobile Competence Centre ; 650, Route Des Lucioles ; F-06921 Sophia-Antipolis Cedex; France, No. V8.1.0, Mar. 1, 2008 (Mar. 1, 2008), pp. 1-28, XP050377637.

"3rd Generation Partnership Project; Technical Specification Group Radio Access Network; Evolved Universal Terrestrial Radio Access (E-UTRA); Packet Data Convergence Protocol (PDCP) specification (Release 8)", 3GPP Standard; 3GPP TS 36.323, 3rd Searched (IPC) Generation Partnership Project (3GPP), Mobile Competence Centre ; 650, Route Des Lucioles ; F-06921 Sophia-Antipolis Cedex; France, No. V8.2.1, May 1, 2008 (May 1, 2008), pp. 1-25, XP050377638.

NEC: "Lower PDCP layer for Mobility", TSG-RAN Working Group Meeting, XX, XX, vol. TSG-RAN Working Grou, No. 2 #53, May 19, 2006 (May 19, 2006), pp. 1-5, XP007904153.

Chinese Second Office Action issued May 18, 2015 in CN 201210301159.8 and English translation, 9 pages.

European Official Action dated Dec. 12, 2013 in European Application No. 08793753.8-1862.

Chinese Third Office Action dated Dec. 10, 2015 issued in CN 201210301159.8 and English translation, 7 pages.

\* cited by examiner

METHOD FOR TRANSMITTING STATUS REPORT OF PDCP LAYER IN MOBILE TELECOMMUNICATIONS SYSTEM AND RECEIVER OF MOBILE TELECOMMUNICATIONS

This application is a continuation of, and claims the benefit of, U.S. application Ser. No. 13/051,803, filed Mar. 18, 2011, which is a continuation of U.S. application Ser. No. 12/523,090, filed Jul. 14, 2009, which is a U.S. National Phase entry of International Application No. PCT/KR2008/005345, filed on Sep. 10, 2008, and claims the benefit of U.S. Provisional Application No. 60/971,480, filed Sep. 11, 2007 and Korean Patent Application No. 10-2008-0088970, filed on Sep. 9, 2008, each of which are hereby incorporated by reference as if fully set forth herein.

TECHNICAL FIELD

The present invention relates to a method for transmitting a PDCP status report for reporting to another party a reception status of a PDCP SDU in a PDCP layer in Long Term Evolution (LTE) system.

BACKGROUND ART

FIG. 1 shows an exemplary network structure of a Long Term Evolution (LTE) system as a related art mobile communication system. The LTE system is a system that has evolved from the existing UMTS system, and its standardization work is currently being performed by the 3GPP standards organization.

The LTE network can roughly be divided into an Evolved UMTS Terrestrial Radio Access Network (E-UTRAN) and a Core Network (CN). The E-UTRAN generally comprises a terminal (i.e., User Equipment (UE)), a base station (i.e., eNode B), an Access Gateway (aGW) that is located at an end of the network and connects with one or more external networks. The aGW may be divided into a portion for handling user traffic and a portion for processing control traffic. In this case, the access gateway part that processes the user traffic and the access gateway part that processes the control traffic may communicate with a new interface. One or more cells may exist in a single eNB. An interface may be used for transmitting user traffic or control traffic between eNBs. The CN may include the access gateway and a node or the like for user registration of the UE. An interface for discriminating the E-UTRAN and the CN may be used.

FIG. 2 shows an exemplary control plane architecture of a radio interface protocol between a terminal and an E-UTRAN according to the 3GPP radio access network standard. FIG. 3 shows an exemplary user plane architecture of a radio interface protocol between a terminal and an E-UTRAN according to the 3GPP radio access network standard.

Hereinafter, structures of radio interface protocols between a terminal and an E-UTRAN will be described with reference to FIGS. 2 and 3.

The radio interface protocol is horizontally comprised of a physical layer, a data link layer, and a network layer, and vertically comprised of a user plane for transmitting user data and a control plane for transferring control signaling. The protocol layer as shown in FIGS. 2 and 3 may be divided into L1 (Layer 1), L2 (Layer 2), and L3 (Layer 3) based upon the lower three layers of the Open System Interconnection (OSI) standards model that is widely known in the field of communication systems. These radio protocol layers exist as pairs between the terminal and the E-UTRAN and handle a data transmission over a radio interface.

Hereinafter, particular layers of the radio protocol control plane of FIG. 2 and of the radio protocol user plane of FIG. 3 will be described below.

The physical layer (Layer 1) uses a physical channel to provide an information transfer service to a higher layer. The physical layer is connected with a medium access control (MAC) layer located thereabove via a transport channel, and data is transferred between the physical layer and the MAC layer via the transport channel. The transport channel is divided into a dedicated transport channel and a common channel according to whether or not a channel is shared. Also, between respectively different physical layers, namely, between the respective physical layers of the transmitting side (transmitter) and the receiving side (receiver), data is transmitted via a physical channel.

The second layer includes various layers. First, a medium access control (MAC) layer performs mapping various logical channels to various transport channels and performs logical channel multiplexing by mapping several logical channels to a single transport channel. The MAC layer is connected to an upper layer called a radio link control (RLC) layer by a logical channel. The logical channel is divided into a control channel that transmits information of the control plane and a traffic channel that transmits information of the user plane according to a type of transmitted information.

An RLC (Radio Resource Control) layer of the second layer segments and/or concatenates data received from an upper layer to adjust the data size so as for a lower layer to suitably transmit the data to a radio interface. In addition, in order to guarantee various QoSs (Quality of services) required by each radio bearer RB, the RLC layer provides three operational modes: a TM (Transparent Mode); a UM (Unacknowledged Mode); and an AM (Acknowledged Mode). In particular, the RLC layer operating in the AM (referred to as an 'AM RLC layer', hereinafter) performs a retransmission function through an automatic repeat and request (ARQ) function for a reliable data transmission.

A packet data convergence protocol (PDCP) layer of the second layer performs a function called header compression that reduces the size of a header of an IP packet, which is relatively large and includes unnecessary control information, in order to effectively transmit the IP packet such as an IPv4 or IPv6 in a radio interface having a narrow bandwidth. The header compression increases transmission efficiency between radio interfaces by allowing the header part of the data to transmit only the essential information.

The RRC layer located at the lowermost portion of the third layer is defined only in the control plane, and controls a logical channel, a transport channel and a physical channel in relation to configuration, reconfiguration, and the release of radio bearers (RBs). In this case, the RBs refer to a logical path provided by the first and second layers of the radio protocol for data transmission between the UE and the UTRAN. In general, configuration (or setup) of the RB refers to the process of stipulating the characteristics of a radio protocol layer and a channel required for providing a particular data service, and setting the respective detailed parameters and operational methods.

FIG. 4 shows an exemplary structure of a PDCP entity. Hereinafter, description of the PDCP entity will be given in detail. It should be noted that blocks as shown in FIG. 4 are functional blocks, therefore there may have a difference when actually implementing such blocks.

The PDCP entity is upwardly connected to the RRC layer or a user application, and downwardly to the RLC layer. Detailed structure thereof is described as below.

One PDCP entity as shown in FIG. 4 is comprised of a transmitting side and a receiving side. The transmitting side at the left may configure an SDU received from an upper layer as a PDU or configure control information generated by the PDCP entity itself as a PDU, and transmit the same to a peer PDCP entity as a receiving side. The receiving side at the right, the peer PDCP entity, abstracts PDCP SDU or control information from the PDCP PDU received from the transmitting side.

As described above, the PDU generated by the transmitting side of the PDCP entity may have two types of a Data PDU and a Control PDU. First, the PDCP Data PDU is a data block formed by processing the SDU received from the upper layer by the PDCP entity, and the PDCP Control PDU is a data block generated by the PDCP entity itself to deliver control information to the peer entity.

The PDCP Data PDU is generated in RBs of the user plane (U-plane) and the control plane (C-plane), and some functions of the PDCP entity are selectively applied according to the type of a used plane. That is, the header compression function is applied only to U-plane data, and an integrity protection function among the security functions is applied only to C-plane data. In addition to the integrity protection function, a ciphering function for data security may also be included in the security functions. Here, the ciphering function is applied to both the U-plane data and the C-plane data.

The PDCP Control PDU is generated in a U-plane RB only, and may be roughly divided into two types: a 'PDCP status report' for notifying a PDCP entity receiving buffer status to the transmitting side; and a 'Header Compression (HC) feedback packet' for notifying a status of a receiving side header decompressor to a transmitting side header compressor.

FIG. 5 is a block diagram illustrating processing steps of each PDCP PDU in a PDCP entity.

In particular, FIG. 5 shows processing steps of the three types of PDCP PDUs (i.e., the PDCP Data PDU, the PDCP control PDU for PDCP status report, and the PDCP Control PDU for header compression feedback) in the PDCP entity through paths ① to ⑧. Descriptions of the processing paths of the PDCP entity for each type of PDUs will be given as below.

1. The process of handling the PDCP Data PDU in the PDCP entity is related to the paths ①, ⑧, ③ and ⑦. Hereinafter, each path will be described.

Path ①: The transmitting side PDCP performs the header compression and security on a SDU received from an upper layer, and then generates a PDCP Data PDU by adding a PDCP Sequence Number (SN), a D/C field indicating whether it is Data PDU or Control PDU, etc. into a header, thereby transmitting the same to the receiving side PDCP entity (i.e., the peer PDCP entity). Here, the header compression may be performed by a header compressor.

Path ⑧: The receiving side PDCP entity removes the header from the PDCP Data PDU delivered from the lower layer, and decompresses the PDCP SDU by performing the security check and header decompression, thereby delivering the same to the upper layer. The PDCP SDU is delivered in sequence to the upper layer. If the PDCP SDU is received out of sequence, it is reordered in a receiving buffer and then delivered to the upper layer. Here, the header decompression may be performed by a header decompressor.

Path ③: The transmitting PDCP entity may piggyback a HC feedback packet on the PDCP Data PDU (e.g., the HC feedback packet is transmitted by being added or included in the PDCP Data PDU). Here, the HC feedback packet receives information from the header decompression of the receiving side PDCP entity which is co-located to the transmitting side PDCP entity, and generates a packet by piggybacking such information on the PDCP SDU when performing the header compression on the PDCP SDU received from the upper layer. Then, the security is performed on the PDCP SDU and the piggybacked HC feedback packet, and the PDCP SN, D/C field, etc. are added into the header so as to generate the PDCP Data PDU, and thusly to be transmitted to the receiving side PDCP entity from the transmitting side PDCP entity.

Path ⑦: Upon reception of the PDCP Data PDU, the receiving side PDCP entity removes the header first, and performs the security check and the header decompression so as to decompress the PDCP SDU. Here, if the piggybacked HC feedback packet is present, it is abstracted and delivered to the header compression of the co-located transmitting side PDCP entity. Upon receiving the HC feedback packet, the header compression of the transmitting side PDCP entity may determine whether the next packet should be delivered in a full header or a compressed header according to the feedback information.

2. The process of handling the PDCP control PDU for PDCP status report in the PDCP entity is related to the paths ② and ⑤. Hereinafter, each path will be described.

Path ②: The receiving side PDCP entity may check the receiving buffer to request a retransmission of PDCP SDU having not been received from the transmitting side PDCP entity. Here, the receiving buffer status is configured as a PDCP status report, and the configured PDCP status report is transmitted to the co-located transmitting side PDCP entity in the form of the Control PDU. Meanwhile, the header of the PDCP Control PDU may include a D/C field indicating whether the PDU is the Data PDU or the Control PDU, a Control PDU Type (CPT) field indicating whether the Control PDU includes the PDCP status report or the HC feedback packet, and the like.

Path ⑤: Upon receiving the PDCP Control PDU including the PDCP status report, the receiving side PDCP entity delivers the received PDCP status report to the co-located transmitting side PDCP entity. Based on the PDPC status report, the co-located transmitting side PDCP entity retransmits the PDCP SDU having not been received by the receiving side PDCP entity.

3. The process of handling the PDCP Control PDU for HC feedback in the PDCP entity is related to the paths ④ and ⑥. Hereinafter, each path will be described.

Path ④: The transmitting side PDCP entity may transmit the PDCP Control PDU by independently including the HC feedback packet therein, without piggybacking the HC feedback packet on the PDCP Data PDU. Here, the HC feedback packet receives information from the header decompression of the receiving side PDCP entity which is co-located to the transmitting side PDCP entity. The HC feedback packet is configured as the PDCP Control PDU by adding the D/C field, the CPT field, etc. into the header, and then transmitted to the receiving side PDCP entity as a peer entity.

Path ⑥: Upon receiving the PDPC Control PDU including the HC feedback, the receiving side PDCP entity delivers the same to the header compression of the co-located transmitting side PDCP entity. Upon receiving the PDPC Control PDU, the header compression of the transmitting side PDCP entity may determine, according to the feedback information, whether the next packet should be delivered in a full header or a compressed header.

DISCLOSURE OF THE INVENTION

As described above, the receiving side PDCP entity may use the PDCP status report to request the retransmission of the PDCP SDU having not been received from the transmitting side PDCP entity. For this, the PDCP entity should generate a PDCP Control PDU in an appropriate form and transmit the same to another party. However, the type of the format to be used for transmission has not been decided yet.

Therefore, it is an object of the present invention to define a format of a PDCP Control PDU which the receiving side PDCP entity uses to transmit the PDCP status report to the transmitting side PDCP entity as a peer entity. For this, the present invention is to provide a method of informing, by the PDCP entity, a receiving buffer status in the form of a bitmap.

To achieve these objects, there is provided a method for transmitting a status report of a PDCP layer in a mobile telecommunications system in which a method for transmitting, by a receiving side PDCP layer, a status report about a series of data to a transmitting side PDCP layer, the method comprising: determining, by the receiving side PDCP layer, a reception status of the series of data, wherein the series of data is PDCP SDUs; and transmitting, by the receiving side PDCP layer, a reception status report for the PDCP SDUs to the transmitting side PDCP layer, wherein the reception status report is transmitted in the form of a bitmap including sequence number information of the PDCP SDUs indicating whether or not the PDCP SDUs have successfully been received.

Preferably, the reception status report for the PDCP SDUs is transmitted from the receiving side PDCP layer to the transmitting side PDCP layer in the form of a PDCP Control PDU.

Preferably, the PDCP Control PDU includes a bitmap field.

Preferably, the PDCP Control PDU includes a Last Sequence Number (LSN) field or a First Sequence Number (FSN) field.

Preferably, the LSN field indicates a sequence number (SN) of a PDCP SDU corresponding to the last bit of the bitmap field.

Preferably, the FSN field indicates a sequence number (SN) of a PDCP SDU corresponding to the first bit of the bitmap field.

Preferably, the PDCP Control PDU includes a Length field, and the Length field includes information indicating a length of the bitmap.

Preferably, the bitmap field is configured as indicators indicating whether or not each of the PDCP SDUs has successfully been received.

Preferably, each of the indicators is comprised of one bit, and a value of the one bit is set to '0' or '1' so as to indicate whether or not a corresponding PDCP SDU has successfully been received.

To achieve these objects, there is provided a receiver in a mobile telecommunications system according to the present invention, comprising: a communication module which determines whether or not PDCP SDUs received through a PDCP layer have successfully been received; generates information regarding the reception success or failure of the determined PDCP SDUs in the form of a bitmap; and includes the information generated in the form of the bitmap in the PDCP Control PDU for transmission.

Preferably, the PDCP Control PDU includes a Last Sequence Number (LSN) field or a First Sequence Number (FSN) field, wherein the LSN field indicates a Sequence Number (SN) of a PDCP SDU corresponding to the last bit of the bitmap field, and the FSN field indicates a Sequence Number (SN) of a PDCP SDU corresponding to the first bit of the bitmap field.

Preferably, the PDCP Control PDU includes a Length field, wherein the Length field includes information indicating a length of the bitmap.

EFFECT

The present invention has an effect of, when transmitting a PDCP status report so as to re-transmit a PDCP SDU having not been received in the PDCP layer, reducing a size of a header by effectively generating a status report as well as preventing the waste of radio resources.

MODES FOR CARRYING OUT THE PREFERRED EMBODIMENTS

Figure 1:
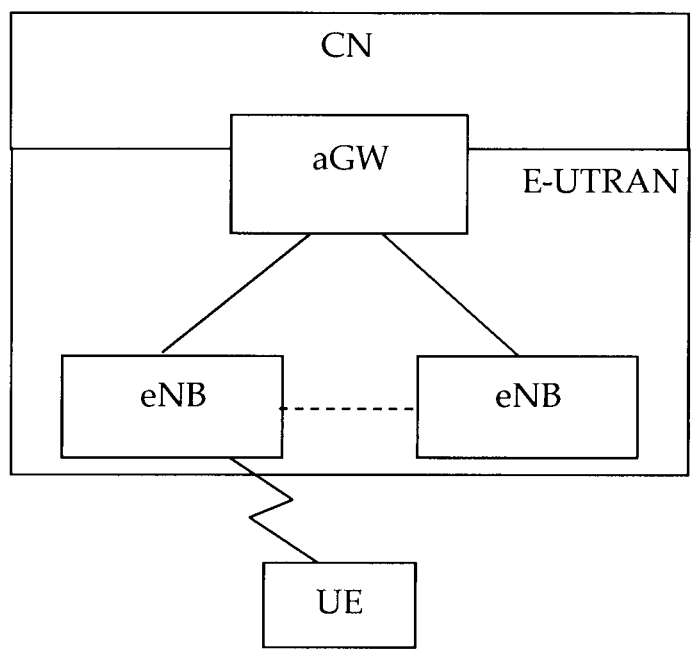
FIG. 1 shows an exemplary network structure of a Long Term Evolution (LTE) system as a related art mobile communication system.
Figure 2:
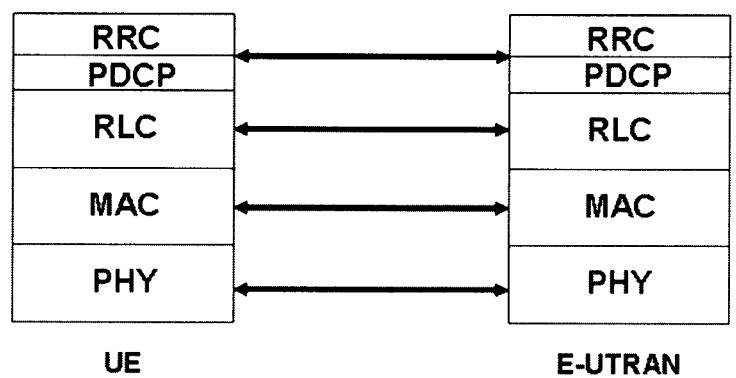
FIG. 2 shows an exemplary control plane architecture of a radio interface protocol between a terminal and an E-UTRAN according to the 3GPP radio access network standard.
Figure 3:
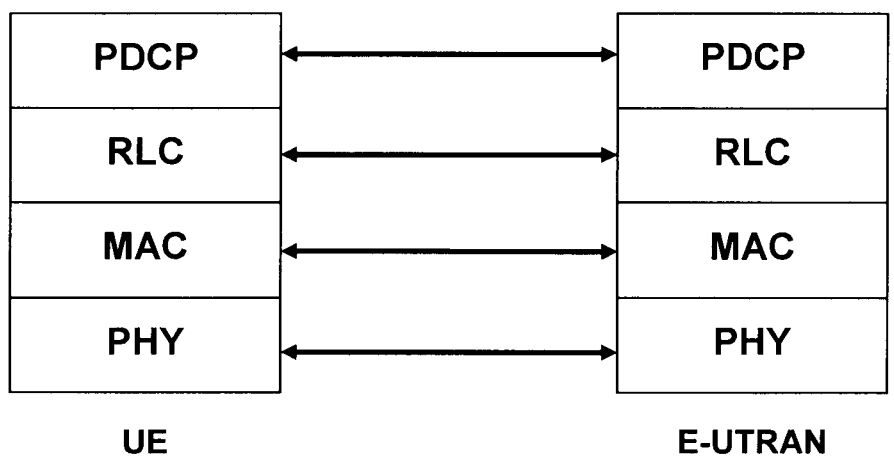
FIG. 3 shows an exemplary user plane architecture of a radio interface protocol between a terminal and an E-UTRAN according to the 3GPP radio access network standard.
Figure 4:
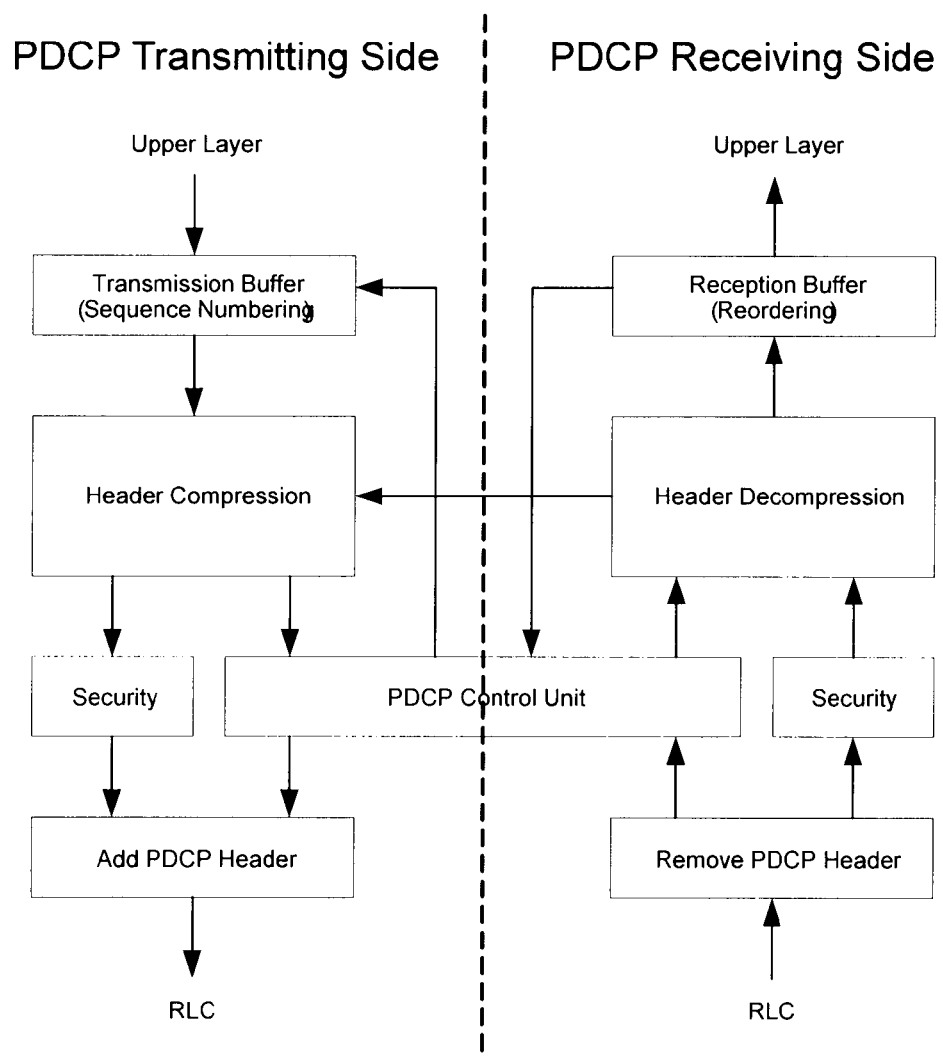
FIG. 4 is a block diagram showing a method of transmitting, by a receiving side, a status report to a transmitting side as a timer expires according to one embodiment of the present invention.

The present invention is applied to the Long Term Evolution (LTE) system of a mobile telecommunications system, and more particularly, to an Evolved Universal Mobile Telecommunications System (E-UMTS) that has evolved from UMTS. However, without being limited thereto, the present invention may be also applied to any mobile telecommunications system and communication protocol to which technical features of the present invention is applicable.

Various modifications and embodiments can be made in the present invention, and reference will be made in detail to the preferred embodiments of the present invention, examples of which are illustrated in the accompanying drawings.

However, it should also be understood that embodiments are not limited by any of the details of the foregoing description, but rather should be construed broadly within its spirit and scope and it is intended that the present invention cover modifications and variations of this invention provided they come within the scope of the appended claims and their equivalents.

Though terms including ordinal numbers such as a first, a second, etc. may be used to explain various components, the components are not limited to the terms.

The terms are used only for the purpose of distinguishing one component from another component. For instance, a first component may be referred to as a second component, or similarly, the second component may be referred to as the first component, without departing from the scope of the present invention. A term 'and/or' is used to include a combination of a plurality of disclosed items or one of the items.

In case it is mentioned that a certain component is "connected" or "accessed" to another component, it may be understood that the certain component is directly connected or accessed to the another component or that a component is interposed between the components. On the contrary, in case it is mentioned that a certain component is "directly connected" or "directly accessed" to another component, it should be understood that there is no component therebetween.

Terms used in the present invention is to merely explain specific embodiments, thus it is not meant to be limiting. A singular expression includes a plural expression except that two expressions are contextually different from each other. In the present invention, a term "include" or "have" is intended to indicate that characteristics, figures, steps, operations, components, elements disclosed on the specification or combinations thereof exist. Rather, the term "include" or "have" should be understood so as not to pre-exclude existence of one or more other characteristics, figures, steps, operations, components, elements or combinations thereof or additional possibility.

Except that they are not differently defined, all terms used in the present invention including technical or scientific terms have the same meanings with terms that are generally understood by those skilled in the art related to the field of the present invention. The terms same as those of which are defined in a general dictionary should be understood that the terms have meanings same as contextual meanings of the related art. And, as long as the terms are not definitely defined in the present invention, the terms are not interpreted as ideal or excessively formal meanings.

The present invention has recognized that there is no appropriate format of a PDCP Control PDU when the receiving side PDCP entity uses the PDCP status report to request the retransmission of the PDCP SDU having not been received from the transmitting side PDCP entity as a peer entity.

Considering such point, the present invention conceptually relates to 1) notify, by the PDCP entity, a status of a receiving buffer in the form of a bitmap, and 2) define a format of a PDCP Control PDU in the form of the bitmap to notify to the transmitting side PDCP entity as a peer entity. 3) That is, the receiving side PDCP entity expresses the reception status of each PDCP SDU in 1 bit such that reception success is set to 1 and reception failure is set to 0. 4) In particular, the presence of the reception success is not determined by whether or not the PDCP PDU has successfully been received, but by whether or not the PDCP SDU has been received. That is, if the PDCP SDU obtained by performing deciphering and header decompression on the received PDCP PDU does not have any error, it is determined to be the reception success.

Figure 5:
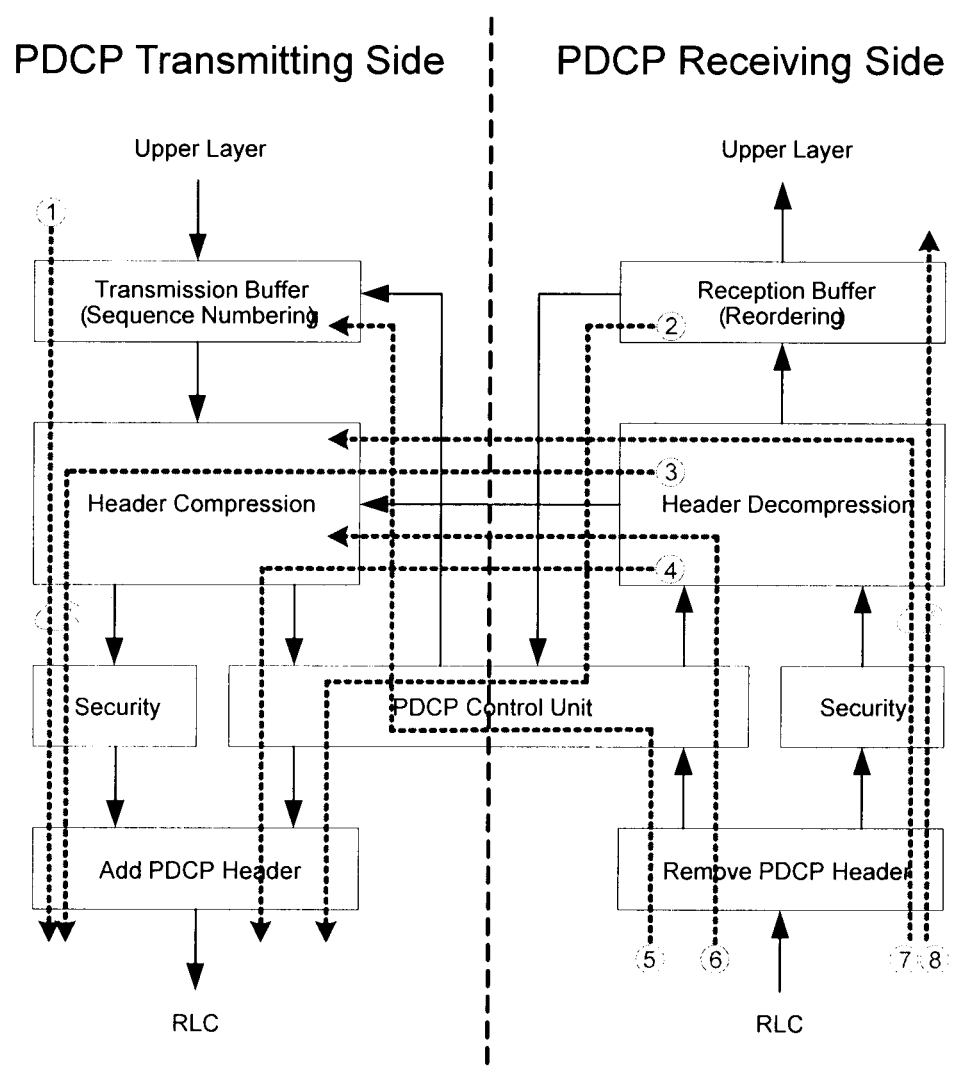
FIG. 5 is a block diagram showing a method of stopping a timer as a PDU, for which the timer has been started, is received according to one embodiment of the present invention.

Among the terms used in the present invention, the Sequence Number (SN) of the PDCP PDU and the Sequence Number (SN) of the PDCP SDU are distinguished from each other. Hereinafter, referring to FIG. 6, the difference between the PDCP PDU and the PDCP SDU, and the difference between the SN of the PDCP PDU and the SN of the PDCP SDU will be described. It should be noted that the contents in FIG. 6 has cited from the contents related to FIG. 5 in the specification of "Korean Patent Application No. 10-2008-0021112 (filed on Mar. 6, 2008) (U.S. provisional application No. 60/895,720 on Mar. 19, 2007)" applied by the applicant of this invention. Meanwhile, other portions in the above application may also be cited for explanation of the present invention.

Figure 6:
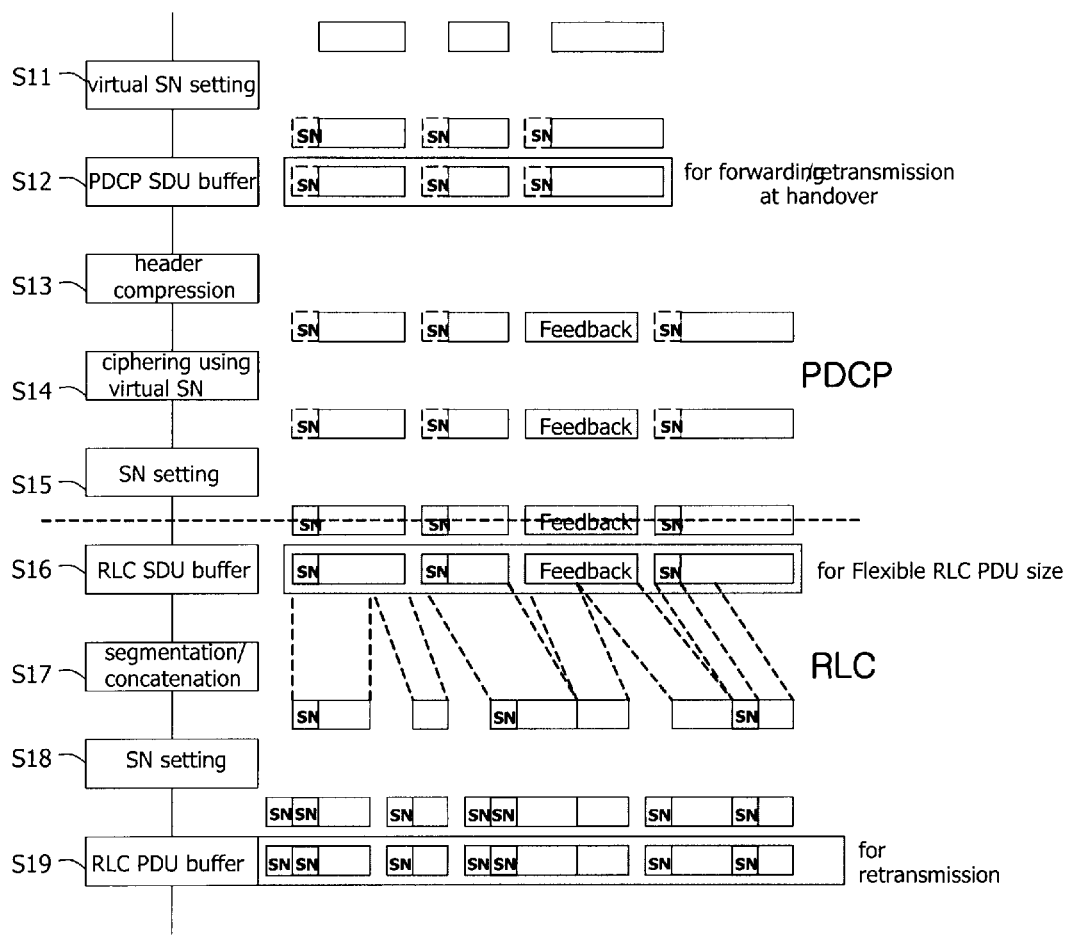
FIG. 6 shows L2 protocol architecture and a sequential order in processing data by a transmitting side.

FIG. 6 shows L2 protocol architecture and a sequential order in processing data by a transmitting side.

FIG. 6 shows the sequential order in processing and transmitting data which has been received by the transmitting side of the RLC and PDCP layers in an LTE from an upper layer. The sequential order is as follows.

Among the terms used in the present invention, an SDU refers to data received from an upper layer and PDU refers to data transmitted to a lower layer after being received from an upper layer and processed.

The terms required for the explanation of the present invention, i.e., the difference between the PDCP PDU and the PDCP SDU, and the difference between the SN of the PDCP PDU and the SN of the PDCP SDU, will now be described with reference to FIG. 6.

S11: As shown in FIG. 6, the PDCP layer receives data (PDCP SDUs) to be transmitted to a lower layer, from an upper layer. The PDCP layer sets a virtual SN (Sequence Number) with respect to each PDCP SDU. In this case, the PDCP SDU SNs are sequentially set to discriminate the respective PDCP SDUs. The step S11 is performed by a first setting module. In S11 in FIG. 6, the SNs are not actually added to the PDCP SDUs but the respective PDCP SDUs are managed by sort of pointers (not shown) which are discriminated by each different SN. For this reason, the SNs in step S11 are expressed as virtual SNs. Furthermore, this reason makes implicit expression in step S11 in FIG. 6 wherein each SN (i.e., virtual SN) of the PDCP SDUs is drawn by dotted lines.

S12: The PDCP layer stores the respective PDCP SDUs in a PDCP SDU buffer. This is for a source base station (i.e., source NodeB) to forward a PDCP SDU whose reception has been unconfirmed by a terminal (UE) to target base station by the source NodeB to the target NodeB during handover.

When the PDCP SDUs are forwarded or re-transmitted during handover, only the PDCP SDUs that have not been properly received by the receiving side according to a status report of the RLC layer or the PDCP layer are forwarded or re-transmitted. This is called a selective forwarding/retransmission. The step 12 is performed by the PDCP SDU buffer. The 2-times virtual SN setting processes and the 3-times PDCP SDU buffering may be simultaneously performed. If the PDCP layer does not support the selective forwarding/retransmission, the PDCP SDU buffer may not be provided.

S13: A header compressor (or header compression module) sequentially performs header compression on the PDCP SDUs. In this case, the header compressor may generate a header compression feedback packet or a PDCP STATUS PDU, etc., which are unrelated to the PDCP SDUs, by itself.

S14: The PDCP layer sequentially ciphers the header-compressed PDCP SDUs. In this case, the PDCP layer performs ciphering by using virtual PDCP SNs which were set when the PDCP SDUs were stored in the buffer. Namely, the PDCP SNs act as input parameters in a ciphering algorithm to serve to generate each different ciphering mask for each SDU. The step S14 is performed by the ciphering module. Besides the ciphering operation, the PDCP layer may perform a security function including an integrity protection function. Also, in case of the integrity protection, the PDCP SDUs are integrity-protected by using virtual PDCP SNs. The PDCP layer may include packets generated by the PDCP layer itself, such as a feedback packet generated by the header compressor itself and the PDCP STATUS PDU, etc., generated by the PDCP layer itself. The feedback packet or the PDCP STATUS PDU, etc. are not ciphered because they do not have any corresponding PDCP SDUs or any set virtual PDCP SNs.

S15: The virtual PDCP SNs (i.e., the SNs set in step S11) corresponding to the respective header-compressed and ciphered PDCP SDUs through the above steps (S13 and S14) are attached to the PDCP PDU headers to form PDCP PDUs. Namely, when the PDCP PDUs are transferred to the RLC layer, the virtual PDCP SNs set in step S11 are explicitly attached to the respective SDUs as PDCP SNs. The step S15 is performed by a second setting module.

In this case, because there is no virtual PDCP SN set for the feedback packet generated by the header compressor itself or the PDCP STATUS PDU generated by the PDCP layer itself, etc., the feedback packet or the PDCP STATUS PDU, etc., configure a PDCP PDU by itself without the PDCP SN. The PDCP layer transfers the thusly configured PDCP PDUs to the lower RLC layer.

S16: Upon receiving the RLC SDUs, namely, the PDCP PDUs, from the PDCP layer, the RLC layer stores them in the RLC SDU buffer. This is to flexibly support the PDU size of the RLC layer.

S17: The RLC layer stores the RLC SDUs in the SDU buffer, and when a lower MAC layer requests transmission of them at every transmission time, the RLC layer segments and/or concatenates the RLC SDUs as many as required according to the requested size. The step S17 is performed by a segmentation and concatenation module.

S18: The RLC layer sequentially attaches RLC SNs to the segmented and/or concatenated data blocks. In this case, the RLC layer may generate an RLC control PDU by itself irrespective of the RLD SDUs. The RLC SN-attached data blocks or the RLC SN-free RLC control PDU constitute RLC PDUs. The step S18 is performed by a third setting module.

S19: Because the AM RLC layer supports re-transmission, the AMC RLC layer stores the constructed RLC PDUs in an RLC PDU buffer. This is for a re-transmission that may be necessary afterwards.

The PDCP SNs in steps S11 and S15 and the RLC SN in step S18 have different properties as described above. Namely, the PDCP SNs are used for ciphering in the PDCP layer and eventually used for forwarding or re-transmitting only the PDCP data whose reception has not been confirmed by the receiving side. Meanwhile, the RLC SNs are used at the RLC layer and have a different purpose from that of the PDCP SNs. That is, in the present invention, when the SDUs are received by the PDCP layer from an upper layer, the PDCP SNs are attached to the SDUs, and when the PDCP SN-attached SDUs are transferred to the RLC layer, the RLC SNs are additionally attached thereto.

Reference will now be given in detail to the preferred embodiments of the present invention, examples of which are illustrated in the accompanying drawings. Wherever possible, the same reference numerals will be used throughout the drawings to refer to the same or similar parts, and the same descriptions thereof are omitted.

The present invention defines the format of the PDCP Control PDU which the receiving side PDCP entity uses to transmit the PDCP status report to the transmitting side PDCP entity as a peer entity. For this, the present invention proposes a method for notifying, by the PDPC entity, a status of a receiving buffer in the form of a bitmap.

Hereinafter, description of the format (or configuration) of a bitmap in PDCP Control PDU corresponding to the PDCP status report will be given. The bitmap is comprised of one or more bits. Each bit of the bitmap includes information about a reception status report, i.e., whether or not the PDCP SDUs have successfully been received.

That is, the receiving side PDCP entity expresses the reception status of each PDCP SDU in 1 bit such that reception success is set to "1" and reception failure is set to "0." Here, the presence of the reception success is not determined by whether or not the PDCP PDU has successfully been received, but by whether or not the PDCP SDU has been received, i.e., if the PDCP SDU obtained by performing deciphering and header decompression on the received PDCP PDU does not have any error. That is, each bit of the bitmap of the PDCP status report acts as an indicator informing the presence of a successful reception of a single PDCP SDU.

Bits adjacent to each other based on a certain bit (this indicates the presence of the reception success of the PDCP SDU having the certain SN) in the bitmap include information regarding whether or not the PDCP SDUs having adjacent sequence numbers have been successfully received. Accordingly, all bitmaps serve as status reports indicating the reception status (i.e., reception success or reception failure) of all PDCP SDUs having sequence numbers within a certain range.

However, accurate sequence numbers of each PDCP SDU cannot be recognized by the bitmap only. In order to notify such accurate sequence numbers, a sequence number corresponding to the first or last SDU of the bitmap should be added into the PDCP Control PDU and then transmitted. In other words, if the receiving side PDCP entity transmits the reception status of the PDCP SDUs in the form of a bitmap to the transmitting side PDCP entity through the PDCP Control PDU, the transmitting side PDCP entity as a peer entity cannot determine, by using the bitmap only, whether or not PDCP SDUs have been successfully received from the received PDCP Control PDU. Therefore, information informing whether or not each bit of the bitmap indicates the PDCP SDU is needed. For this, SN information of the PDCP SDU indicated by the first or the last bit of the bitmap should be included in the PDCP Control PDU. Such SN information of the PDCP SDU may be the SN of a PDCP SDU corresponding to the first bit of the bitmap ('FSN' in FIG. 8) or the SN of a PDCP SDU corresponding to the last bit ('LSN' in FIG. 7).

In addition, when there is a need to notify a length of the bitmap, the Length field indicating the length is also needed.

Hereinafter, description of a format of a PDCP Control PDU for the PDCP status report according to the present invention will be given with reference to FIGS. 7 and 8.

Figure 7:
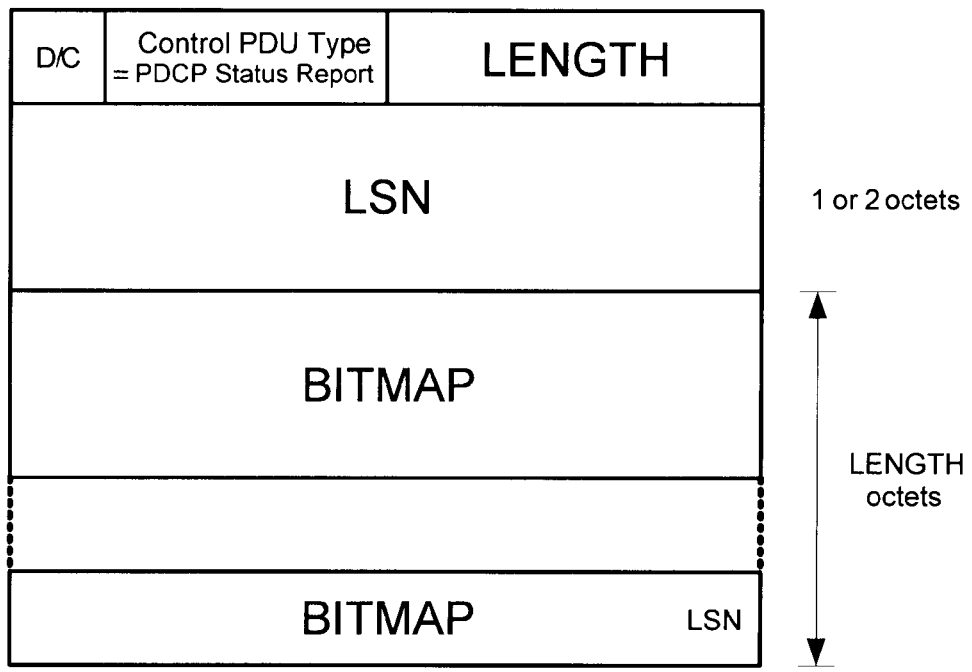
FIG. 7 shows an exemplary format of a PDCP Control PDU for a PDCP status report according to a first embodiment of the present invention.

FIG. 7 shows an exemplary format of a PDCP Control PDU for a PDCP status report according to a first embodiment of the present invention. Here, FIG. 7 shows an embodiment including the 'LSN' field.

The format of the PDCP Control PDU in FIG. 7 may include a LENGTH field, a LSN field and a BITMAP field, in addition to the D/C field and the Control PDU type field. Here, the LENGTH field is an optional field, and may or may not be included in the PDCP Control PDU.

The LENGTH field is added into the PDCP Control PDU when the length of the bitmap should be notified. When there is no need to notify the length of the bitmap, such as if the length of the bitmap is fixed or if the length of the bitmap can be derived from the length of the PDCP Control PDU, the LENGTH field is not required.

The bitmap field includes reception status information of each PDCP SDU indicating whether or not the PDCP SDUs received from the transmitting side PDCP and processed by the receiving side PDCP entity have been successfully received without any error. Here, the SN of the first or last PDCP SDU of the bitmap should be added to accurately notify the sequence numbers of respective PDCP SDUs corresponding to each bitmap. In FIG. 7, the SN of the last PDCP SDU (i.e., Last Sequence Number (LSN)) is added. In addition, FIG. 7 shows the format of the PDCP Control PDU when the length of the bitmap should be notified.

Hereinafter, descriptions of a setting method for the LSN and the bitmap in FIG. 7 will be given in detail.

D/C: a field to indicate whether a corresponding PDCP PDU is Data PDU or Control PDU.

Control PDU Type: a field to indicate the type of corresponding control information, for instance, indicates whether the corresponding control information is a status report or a HC feedback information.

LSN field: includes an SN value of a PDCP SDU corresponding to the last bit of the bitmap field. It is an SN value of a PDCP SDU which has been lastly received or failed to receive by the receiving side PDCP entity. That is, by using the SN of the PDCP SDU corresponding to the last bit, the SNs of the PDCP SDUs indicated by each bit in the bitmap field can be recognized. This is because each bit of the bitmap indicates the reception status of sequential PDCP SDUs. Accordingly, since the last bit, i.e., the LSN, is the SN of the PDCP SDU indicated by the last bit (lowermost bit) of the bitmap, each SN of the corresponding PDCP SDUs indicated by bits below the last bit can be recognized. By using this bitmap format, the size of the PDCP Control PDU for the PDCP status report may be reduced as well as efficiency of radio resources may be enhanced.

BITMAP field: includes reception status report (information) of the PDCP SDUs received from the transmitting side PDCP entity as a peer entity. In the bitmap field including each reception status of the PDCP SDUs, target PDCP SDUs are those of which SNs are [LSN−LENGTH*8+1, LSN] which is between 'LSN−LENGTH*8+1' and 'LSN.' Each bit of each bitmap has reception status information (i.e., PDCP status report) regarding whether or not the PDCP SDUs indicated by each bit have been successfully received. For instance, if an LSN value is '100' and a LENGTH value is '5,' the range of SN of the PDCP SDU as the target of the reception status report would be '61'~'100.'

Each bit_position in the bitmap is 1~LENGTH*8, for instance, if the LENGTH is '5,' each bit_position would be '1'~'40.' That is, the number of bits in the bitmap is 40. In other words, the number of PDCP SDUs which are the targets of the reception status reports (reception success or failure) of corresponding PDCP SDUs is 40. An interpretation method of each bit_position is as follows:

♦1: reception success of a PDCP SDU which is PDCP Sequence Number=(LSN−LENGTH*8+ bit_position).

♦0: reception failure of a PDCP SDU which is PDCP Sequence Number=(LSN−LENGTH*8+ bit_position).

Meanwhile, if the LENGTH is '0,' the Bitmap field does Not exist. In this case, the LSN only is included, considering that all PDCP SDUs have been successfully received.

Figure 8:
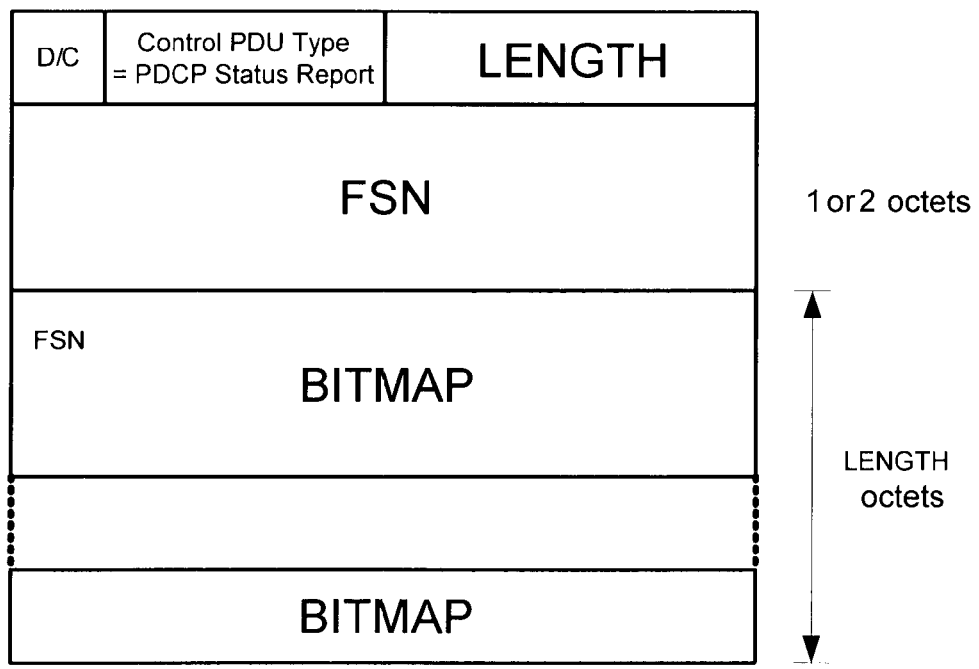
FIG. 8 shows an exemplary format of a PDCP Control PDU for a PDCP status report according to a second embodiment of the present invention.

FIG. 8 shows an exemplary format of a PDCP Control PDU for a PDCP status report according to a second embodiment of the present invention. Here, FIG. 8 shows an embodiment including the 'FSN' field. Hereinafter, the embodiment in FIG. 8 will describe a difference from that given in FIG. 7.

When compared to FIG. 7, the embodiment in FIG. 8 uses the First Sequence Number (FSN), instead of the LSN, to notify an accurate sequence number of a PDCP SDU. This FSN corresponds to an SN of a target PDCP SDU indicated by the first bit of a bitmap. That is, the first bit of the bitmap has information about the reception status of the PDCP SDU indicated by the FSN.

In addition, similar to FIG. 7, when there is no need to notify the length of the bitmap, such as if the length of the bitmap is fixed or if the length of the bitmap can be derived from the length of the PDCP Control PDU, the LENGTH field is not required.

The method of setting the FSN and bitmap by using the FSN, instead of the LSN, has a little difference from that described in FIG. 7.

FSN Field:

A value of the FSN field indicates an SN of a PDCP SDU corresponding to the first bit of the bitmap field.

The value of the FSN field corresponds to the SN of a PDCP SDU which has not been firstly received, by the receiving side PDCP entity, among the PDCP SDUs received from the transmitting side PDCP entity.

Bitmap

It includes reception status report (information) of the PDCP SDUs received from the transmitting side PDCP entity as a peer entity.

A range of the BITMAP indicates PDCP SDUs whose SNs are between [FSN, FSN+LENGTH*8−1], and includes information about the reception success or failure.

In the BITMAP field having each reception status of the PDCP SDUs, target PDCP SDUs are those of which SNs are between 'FSN' and 'FSN+LENGTH*8−1.' Each bit of the bitmaps has reception status information (i.e., PDCP Status Report) regarding whether or not the PDCP SDUs indicated by each bit have been successfully received. For instance, if a FSN value is '100' and a LENGTH value is '5,' a range of SN of the PDCP SDU as the target of the reception status report would be '100'~'139.'

Each bit_position in the bitmap is 1~LENGTH*8, and for instance, if a LENGTH is '5,' the bit_position would be '1'~'40.' That is, the number of the bits in the bitmap is 40. In other words, the number of PDCP SDUs which are the targets of the reception status reports (reception success or failure) of corresponding PDCP SDUs is 40.

An interpretation method of each bit_position is as follows:

♦1: reception success of a PDCP SDU which is PDCP Sequence Number=(FSN+bit_position− 1).

♦0: reception failure of a PDCP SDU which is PDCP Sequence Number=(FSN+bit_position−1).

Meanwhile, if the LENGTH is '0,' the Bitmap field does not exist. In this case, the FSN only is included, considering that all PDCP SDUs have been successfully received.

The embodiments in FIGS. 7 and 8 have described the format of the PDCP Control PDU of the reception status information (i.e., the PDCP status report) for a series of data (i.e., PDCP SDUs) in which the receiving side PDCP entity receives from the transmitting side PDCP entity as a peer entity.

The method for transmitting the PDCP Control PDU of the reception status information (i.e., PDCP status report) for a series of data (i.e., PDCP SDUs) will be summarized as follows.

The receiving side PDCP entity obtains the PDCP SDUs by performing ciphering and header decompression on the PDCP PDUs received from the transmitting side PDCP entity, and then checks whether or not each of the PDCP SDUs has an error and thereby to determine the reception success or failure of each of the PDCP SDUs.

The receiving side PDCP entity adds each indicator (each bit of the bitmap) indicating the reception status (i.e., reception success or failure) of each PDCP SDU into the BITMAP field.

The receiving side PDCP entity configures the PDCP Control PDU including the BITMAP field and transmits the configured PDCP Control PDU to the transmitting side PDCP entity.

Meanwhile, the PDCP Control PDU may include the LENGTH field indicating the size of the BITMAP field.

In addition, the PDCP Control PDU may include LSN field or FSN field. Here, the LSN field has SN information of the PDCP SDU corresponding to the last bit of the BITMAP field. The FSN field has SN information of the PDCP SDU corresponding to the first bit (uppermost bit) of the BITMAP field. Thusly, the present invention uses the LSN and FSN fields, thereby not requiring to have SNs of a corresponding PDCP SDUs for all bit_positions of the BITMAP field, thus to reduce the size of the PDCP Control PDU as well as enhancing efficiency of resources.

Hereinafter, descriptions of a transmitter (transmitting apparatus) and a receiver (receiving apparatus) according to the present invention will be given.

The receiver (receiving apparatus) according to the present invention includes hardware, software, a module having software, and the like that can implement the embodiments of FIGS. 7 and 8.

The apparatus according to the present invention may be called an entity, and the apparatus according to the present invention may be a terminal.

The receiver according to the present invention may include a communication module capable of performing functions described in FIGS. 7 and 8.

That is, there is provided the communication module which determines the reception success or failure for each of in-sequence PDCP SDUs received through the PDCP layer, generates a status report for the determined result in the form of a bitmap, and transmits a PDCP Control PDU including the status report generated in the form of the bitmap.

The PDCP Control PDU includes the LSN field or FSN field. Here, the LSN field indicates a sequence number (SN) of a PDCP SDU corresponding to the last bit of the bitmap field, and the FSN field indicates a sequence number (SN) of a PDCP SDU corresponding to the first bit of the bitmap field.

The transmitter (transmitting apparatus) according to the present invention includes a communication module capable of performing functions described in FIGS. 7 and 8. Here, functions of such communication module have already been described in FIGS. 7 and 8, therefore detailed explanations therefore are omitted.

As described above, the receiver and transmitter according to the present invention basically include software, hardware required for implementing the technical idea of the present invention, in addition to the above-described elements, such as an output unit (display, speaker, or the like), an input unit (keypad, microphone, and the like), a memory, a microprocessor, a transmission/reception unit (RF module, antenna, and the like). Such elements are obvious to the person in the art, so description for them will be omitted.

The method described so far may be implemented by software, hardware or their combination thereof. For example, the method according to the present invention may be implemented by codes or command languages in a software program that can be stored in a storage medium (e.g., an internal memory of a mobile terminal, a flash memory, a hard disk, or the like), and that can be executed by a processor (e.g., an internal microprocessor of a mobile terminal).

It will also be apparent to those skilled in the art that various modifications and variations can be made in the present invention without departing from the spirit or scope of the invention. Thus, it is intended that the present invention cover modifications and variations of this invention provided they come within the scope of the appended claims and their equivalents.

What is claimed is:

1. A method for transmitting a status report in a packet data convergence protocol (PDCP) layer of a mobile communication system, the method comprising:
    generating, by a receiving side, the status report for one or more PDCP service data units (SDUs) that were transmitted from a transmitting side,
    wherein the status report indicates whether or not the transmitted PDCP SDUs have been successfully received at the receiving side,
    wherein the status report is generated in a form of a bitmap, and
    wherein a specific bit in the bitmap indicates whether or not a corresponding one of the PDCP SDUs has successfully been received, and
    transmitting, by the receiving side, the status report to the transmitting side.

2. The method of claim 1, wherein the specific bit in the bitmap is configured with a single bit.

3. The method of claim 2, wherein the single bit is set to '0' or '1' for indicating whether or not the corresponding one of the PDCP SDUs has successfully been received.

4. The method of claim 3, wherein the single bit is set to '0' when the corresponding one of the PDCP SDUs is missing in the receiving side.

5. The method of claim 3, wherein the single bit is set to '1' when the corresponding one of the PDCP SDUs does not need to be retransmitted.

6. The method of claim 1, wherein the status report is carried by a PDCP protocol data unit (PDU), and wherein a format of the PDCP PDU includes a bitmap field for the bitmap.

7. The method of claim 6, wherein a length of the bitmap is variable, and wherein the length of the bitmap field can be '0'.

8. A receiver, comprising:

processing circuitry configured to generate a status report in a packet data convergence protocol (PDCP) layer of a mobile communication system for one or more PDCP service data units (SDUs) that were transmitted from a transmitting entity, wherein the status report indicates whether or not the transmitted PDCP SDUs have been successfully received at the receiver, wherein the status report is generated in a form of a bitmap, and wherein a specific bit in the bitmap indicates whether or not a corresponding one of the PDCP SDUs has successfully been received, and a transmitter configured to transmit the status report to the transmitting entity.

9. The receiver of claim 8, wherein the specific bit in the bitmap is configured with a single bit.

10. The receiver of claim 9, wherein the processing circuitry is configured to set the single bit to '0' or '1' for indicating whether or not the corresponding one of the PDCP SDUs has successfully been received.

11. The receiver of claim 10, wherein the processing circuitry is configured to set the single bit to '0' when the corresponding one of the PDCP SDUs is missing in the receiving side.

12. The receiver of claim 10, wherein the processing circuitry is configured to set the single bit to '1' when the corresponding one of the PDCP SDUs does not need to be retransmitted.

13. The receiver of claim 8, wherein the status report is carried by a PDCP protocol data unit (PDU), and wherein a format of the PDCP PDU includes a bitmap field for the bitmap.

14. The receiver of claim 8, wherein a length of the bitmap is variable, and wherein the length of the bitmap field can be '0'.

\* \* \* \* \*

UNITED STATES PATENT AND TRADEMARK OFFICE
CERTIFICATE OF CORRECTION

PATENT NO. : 9,503,916 B2  Page 1 of 1
APPLICATION NO. : 13/970508
DATED : November 22, 2016
INVENTOR(S) : Yi et al.

It is certified that error appears in the above-identified patent and that said Letters Patent is hereby corrected as shown below:

In the Specification

Column 12, Line 11, change "Not" to --not--

Column 12, Line 41, change "Bitmap" to --BITMAP--

Column 14, Lines 5-6, change second instance of "therefore" to --therefor--

Signed and Sealed this
Eleventh Day of July, 2017

Joseph Matal
*Performing the Functions and Duties of the*
*Under Secretary of Commerce for Intellectual Property and*
*Director of the United States Patent and Trademark Office*